Nov. 17, 1959  W. E. RUDISCH  2,913,081
CLUTCH
Filed Aug. 1, 1958  2 Sheets-Sheet 1
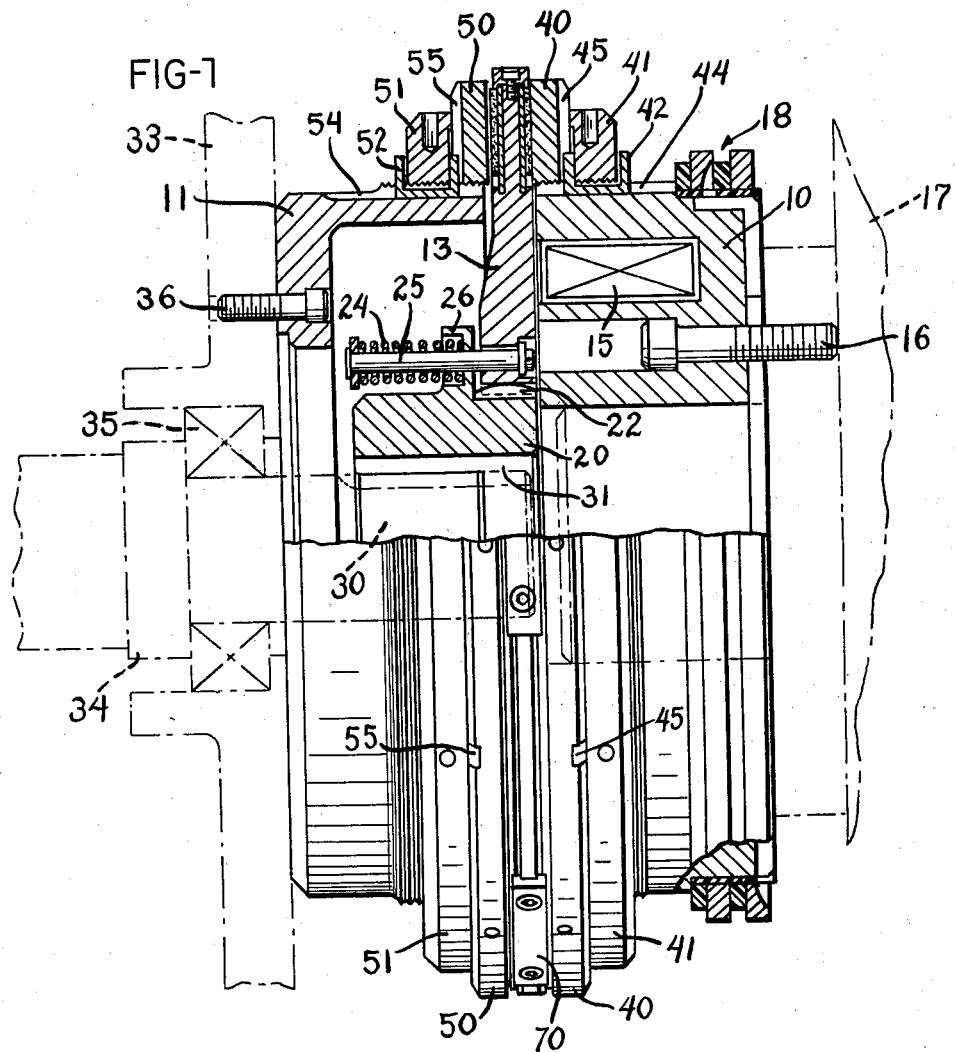
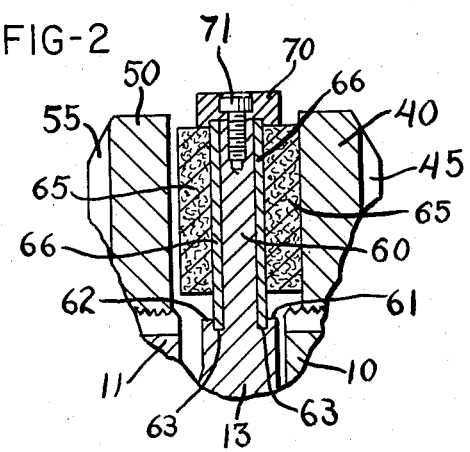
INVENTOR.
WALTER E. RUDISCH
BY Maréchal, Biebel, French & Bugg
ATTORNEYS Nov. 17, 1959 W. E. RUDISCH 2,913,081
CLUTCH
Filed Aug. 1, 1958 2 Sheets-Sheet 2
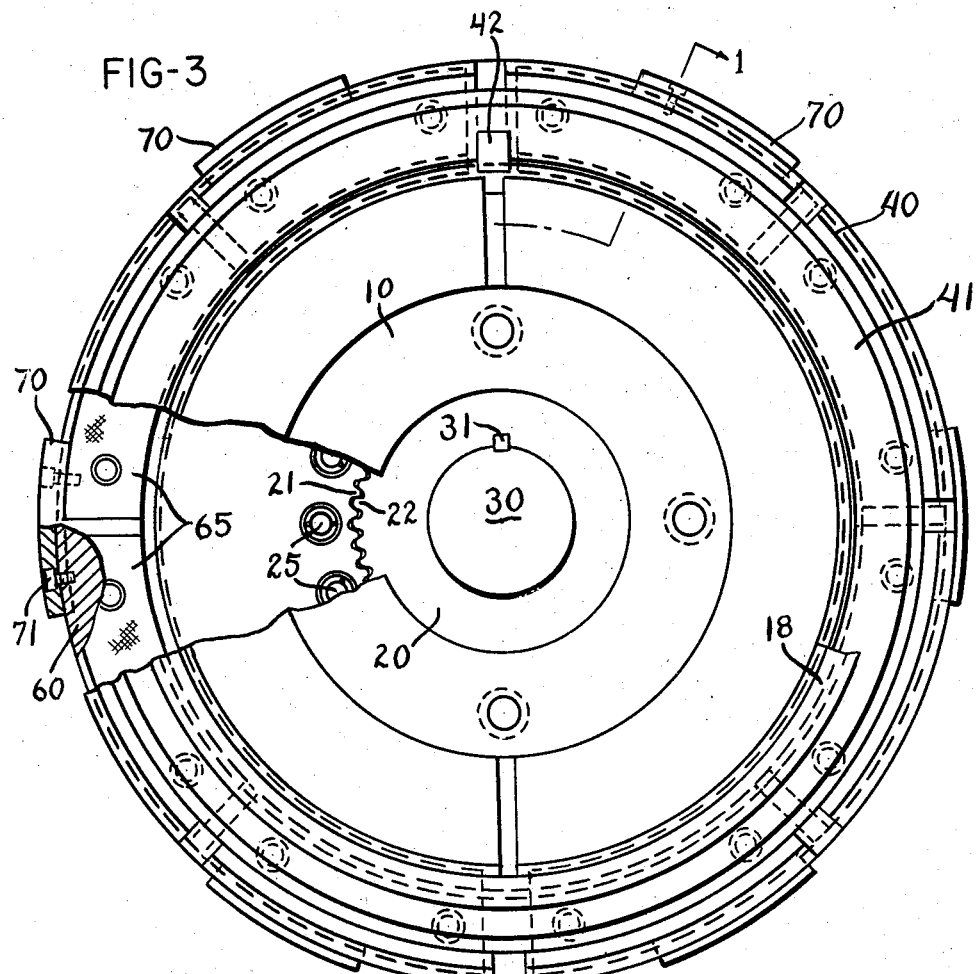
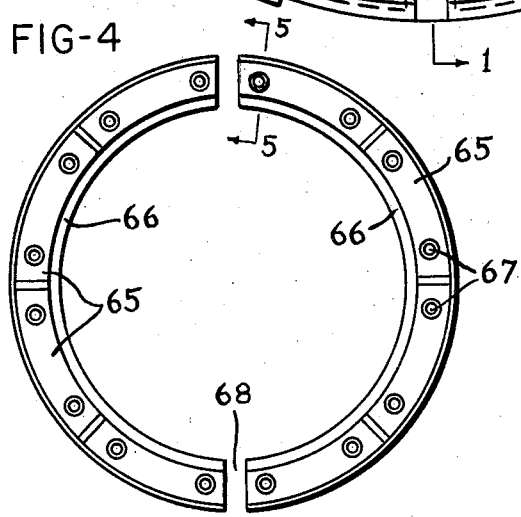
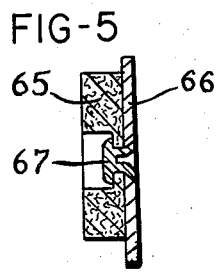
INVENTOR.
WALTER E. RUDISCH
BY
Maréchal, Biebel, French & Bugg
ATTORNEYS United States Patent Office 2,913,081
Patented Nov. 17, 1959

2,913,081

CLUTCH

Walter E. Rudisch, Dayton, Ohio, assignor to McCauley Industrial Corporation, Dayton, Ohio, a corporation of New York Application August 1, 1958, Serial No. 752,577

2 Claims. (Cl. 192—18)

This invention relates to friction drive assemblies.

The invention has particular relation to friction clutch-brake assemblies of the type wherein the driven member is selectively urged into frictional engagement with either a driving member or a stationary brake member. In assemblies of this type, one or both of each set of opposed friction surfaces commonly incorporates friction elements which are removable and replaceable after they have been worn down in use. The present invention is concerned particularly with the fact that this maintenance is often complicated by the fact that the cooperating friction surfaces are relatively closely spaced, as well as surrounded by additional portions of the assembly, so that access to the friction elements is difficult and may require partial disassembly of other parts.

It is a primary object of the present invention to provide a clutch-brake assembly of the above general type wherein the removable and replaceable frictional elements are so constructed and arranged that they are quickly and easily removed and replaced without affecting the normal relation of the associated parts of the assembly or otherwise requiring disassembly thereof.

A specific object of the invention is to provide such a clutch-brake assembly wherein the removable and replaceable friction elements are located in operative position by clamping members located in readily accessible positions on the outer periphery of the assembly and wherein removal and replacement of these friction elements require simple release of such clamping members and replacement of the friction elements by radial movement between the associated cooperating members of the assembly.

An additional object of the invention is to provide a clutch-brake assembly as outlined above wherein the removable and replaceable friction elements are all mounted on the driven member which is located between the driving clutch member and the stationary brake member, and wherein these clutch elements are held in operative position on each side of the driven member by the same releasable clamping members mounted on the outer periphery of the driven member.

It is also an object of the invention to provide a removable and replaceable friction element combination as outlined above which is applicable to any pair of opposed transmission members supported for relative rotation in close coaxial relation and adapted for relative axial movement into and out of frictional engagement with each other.

Other objects and advantages of the invention will be apparent from the following description, the accompanying drawings and the appended claims.

In the drawings—

Fig. 1 is a view partly in side elevation and partly in section on the line 1—1 of Fig. 3 showing a clutch-brake assembly constructed in accordance with the invention;

Fig. 2 is an enlarged fragment of Fig. 1;

Fig. 3 is a view partly in elevation looking from right to left in Fig. 1 and partly broken away to illustrate details of internal construction;

Fig. 4 is a detail view showing a set of friction elements in the assembly of Figs. 1–3; and Fig. 5 is an enlarged section on the line 5—5 of Fig. 4.

Referring to the drawings, which illustrate a preferred embodiment of the invention, the clutch-brake assembly comprises a driving clutch member 10, a stationary brake member 11, and a driven member 13 intermediate the driving and stationary members 10 and 11. The assembly is shown as constructed for electromagnetic operation of the clutch portion, and the driving member 10 accordingly constitutes a magnet body which incorporates an energizing coil 15. The magnet body 10 is shown at 16 as bolted to a portion of the flywheel 17 or other driving part, and it also carries the necessary insulated slip ring assembly 18 for connecting the coil 15 with an outside source of energizing current.

The driven member 13 is shown as an annular plate which also constitutes the armature for the magnet body 10, and this armature plate 13 is mounted for limited axial movement on a sleeve 20 by means of a splined connection 21—22. The plate 13 is continuously urged away from the magnet body 10 and toward the brake member 11 by a plurality of springs 24 and cooperating pins 25 carried by the perforated circumferential flange portion 26 of the sleeve 20. The plate 13 may be moved against the bias of the springs 24 by the magnetic force developed across the gap between it and the magnet body 10 when the coil 15 is energized, and the spline teeth 22 on the sleeve 20 are shown as curved to facilitate free such axial movement of the plate 13 thereon.

The sleeve 20 is secured to the end of the driven shaft 30 by a suitable connection preventing both axial and angular movement thereof with respect to the shaft, as represented by the key 31. The shaft 30 should also be mounted in the adjacent stationary structure represented at 33, such as the wall of the transmission housing, by means limiting its projection within the brake member 11, as indicated by the collar 34 and bearing 35. The brake member 11 should also be secured to the stationary structure 33, as by the screws 36, to provide the desired braking action on the shaft 30 when the plate 13 is brought into contact therewith by the springs 24.

The driving clutch member or magnet body 10 and the stationary brake member 11 are both provided with friction surfaces for cooperation with the driven plate 13. Referring to Fig. 1, the clutch plate 40 is a ring which is threaded on the outer periphery of the part 10 and is held firmly in adjusted position thereon by means of a lock nut 41 and a key 42 which engages simultaneously in a groove 44 in the periphery of the part 10 and one of the radial grooves 45 in the rear face of the part 40. The brake plate 50 is identical with the clutch plate 40 and is similarly held in position by a lock nut 51 and key 52 fitting in grooves 54 in the brake member 11 and 55 in the rear face of the brake plate 50.

The invention is concerned particularly with the structure and arrangement of the removable and replaceable friction elements which are carried by the driven member 13 for engagement with the opposed friction surfaces of the clutch and brake plates 40 and 50. Referring particularly to Fig. 2, the driven armature plate 13 includes an annular rim portion 60 which extends between the plates 40 and 50. This rim portion 60 is of reduced thickness with respect to the inner portion of the plate 13 to provide an annular shoulder 61 and 62 facing radially outwardly on each side of the plate. In addition, each of these shoulders is grooved at 63 along its inner edge.

The rim portion 60 of the plate 13 is provided with a plurality of removable friction elements each of which includes a friction plate 65, which may be of any suitable brake or clutch lining material, and a metal backing plate 66, and these parts are secured together by means such as rivets 67 as indicated in Fig. 5. The inner periphery of each of the backing plates 66 is arcuately curved on substantially the same radius as the grooved portion 63 of each of the shoulders 61 and 62, and this curved edge of each of the backing plates 66 is of not more than 180° in angular extent so that these plates can be engaged by radial movement with the grooves 63. Satisfactory results have been obtained with a pair of friction elements of this construction on each side of the plate 13 proportioned as indicated in Figs. 3 and 4 to provide a small clearance between their abutting ends at 68.

With the friction elements 65—66 constructed as described, they can be removed from and replaced in operative position by radial movement between rim portion 60 and the opposed friction surfaces of the plates 40 and 50 without affecting the relationship of these parts. In addition, the invention provides means for holding the friction elements in operative position which are similarly accessible from outside the assembly. Such means are shown as comprising a plurality of grooved clamp members 70 which are proportioned to straddle the rim portion 60 and to engage the outer peripheries of the backing plates 66 of the friction elements on either side of the rim portion 60. The clamp members 70 are secured in operative position by a pair of screws 71 threaded into radial bores in the outer periphery of the rim portion 60, and when these screws are properly tightened, the clamp members 70 will hold the friction elements firmly in operative position through their frictional engagement in the groove portions 63 of the shoulders 61 and 62.

The invention accordingly provides a clutch-brake assembly wherein removal and replacement of the friction elements which are subject to wear can be quickly and easily carried out without affecting any of the other parts, and particularly without requiring disassembly of any of the other portions of the clutch and brake. All that is required for such replacement is to move the clamp members 70 by releasing the screws 71, withdraw the worn clutch elements 65—66, replace them with new clutch elements, and then replace and tighten the clamp elements. It will also be apparent that the principles of the invention as illustrated by the embodiment described are applicable to a wide variety of transmission assemblies irrespective of size.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a clutch-brake assembly including a driving clutch member, a stationary brake member, a driven member coaxial with and intermediate said driving and stationary members, and means for selectively urging said driven member toward said driving and stationary members, the combination of means forming annular friction surfaces on opposed portions of said driving and stationary members, said driven member including a plate having thereon an annular rim portion extending radially between said friction surfaces, said rim portion being of less thickness than the adjacent portion of said plate to provide radially outwardly facing shoulders on said plate bordering said rim portion, each of said shoulders having a groove therein at the junction thereof with said rim portion, a plurality of friction elements on each side of said rim portion for engagement with said friction surfaces, said friction elements being complementary in shape to said rim portion and each of not more than 180° in angular extent for positioning on said rim portion by radial insertion between said rim portion and said friction surfaces to provide for removal and replacement thereof while retaining said driving and stationary members in normal relation, each of said friction elements including a layer of friction material and a rigid backing plate adapted to engage said groove in the adjacent said shoulder, a plurality of clamp members proportioned to straddle the periphery of said plate in engagement with the outer peripheries of said backing plates of said friction elements, and means for securing said clamp members to said plate in position clamping said backing plates into retained engagement with said grooves.

2. In a transmission of the character described, the combination of a pair of members supported for relative rotation in closely coaxial relation, means forming an annular friction surface on one of said members, the other said member including an annular rim portion axially overlying said friction surface, said other member including a radially outwardly facing shoulder bordering said rim portion, said shoulder having a groove therein at the junction thereof with said rim portion, means for selectively urging said members toward and away from each other, a plurality of friction elements on said rim portion for engagement with said friction surface, said friction elements being complementary in shape to said rim portion and each of not more than 180° in angular extent for positioning on said rim portion by radial insertion between said rim portion and said friction surface to provide for removal and replacement thereof while retaining said members in normal relation, each of said friction elements including a layer of friction material and a rigid backing plate of greater radial dimensions than said layer of friction material and adapted to engage in said groove in said shoulder, a plurality of clamp members proportioned to straddle the periphery of said plate and the outer peripheries of said backing plates of said friction elements, and means for securing said clamp members to said plate in clamping relation with said backing plates maintaining said backing plates in engagement with said groove.

References Cited in the file of this patent

UNITED STATES PATENTS

| | | |
|---|---|---|
| 1,702,000 | Gibson et al. | Feb. 12, 1929 |
| 2,015,890 | Gottschalk | Oct. 1, 1935 |
| 2,237,624 | Oldham | Apr. 8, 1941 |
| 2,759,582 | Dehn | Aug. 21, 1956 |
| 2,767,817 | Davis | Oct. 23, 1956 |